(12) United States Patent
Ferrier et al.

(10) Patent No.: US 9,371,177 B2
(45) Date of Patent: Jun. 21, 2016

(54) COFFEE POD HAVING A FLEXIBLE MICROPOROUS OR MICROPERFORATED CASING

(71) Applicants: Frederic Ferrier, Cantaron (FR); Andre Luciani, Marseilles (FR)

(72) Inventors: Frederic Ferrier, Cantaron (FR); Andre Luciani, Marseilles (FR)

( * ) Notice: Subject to any disclaimer, the term of this patent is extended or adjusted under 35 U.S.C. 154(b) by 0 days.

(21) Appl. No.: 14/569,959

(22) Filed: Dec. 15, 2014

(65) Prior Publication Data
US 2015/0099039 A1   Apr. 9, 2015

Related U.S. Application Data

(62) Division of application No. 13/811,774, filed as application No. PCT/FR2011/051761 on Jul. 21, 2011, now Pat. No. 8,940,348.

(30) Foreign Application Priority Data

Jul. 28, 2010 (FR) .................................... 10 56208

(51) Int. Cl.
*B65D 85/804* (2006.01)
*A47J 31/36* (2006.01)
*B65D 81/00* (2006.01)

(52) U.S. Cl.
CPC ......... *B65D 85/8046* (2013.01); *A47J 31/3633* (2013.01); *A47J 31/3638* (2013.01); *B65D 2081/007* (2013.01)

(58) Field of Classification Search
CPC ............. A23F 5/208; A23F 5/24; A23F 5/26; B65D 2081/001–2081/007; B65D 85/8043–85/8046; A47J 31/0668; A47J 31/407; A47J 31/4492; A47J 31/3623–31/3642
USPC ............................. 426/77–84, 115, 594–595
See application file for complete search history.

(56) References Cited

U.S. PATENT DOCUMENTS 1,473,430 A * 11/1923 Hirschhorn .......... B65D 85/808
                                                              206/0.5
3,334,803 A *  8/1967 Abbey ................. B65D 85/808
                                                              206/0.5
(Continued)

FOREIGN PATENT DOCUMENTS

EP   0948926 A1   10/1999
EP   0948927 A1   10/1999
(Continued)

OTHER PUBLICATIONS

Polyester Fibers, Raghavendra R Hegde, Atul Dahiya, M.G. Kamath, Apr. 2004, pp. 1-12, www.engr.utk.edu/mse/Textiles/Polyester%20fiber.htm.*
(Continued)

*Primary Examiner* — Drew Becker
(74) *Attorney, Agent, or Firm* — Caesar Rivise, PC

(57) ABSTRACT

A coffee pod which can be used for machines for preparing and dispensing coffee beverages that comprise at least one extraction chamber, and at least one piston for compacting a predetermined amount of ground coffee inserted into the extraction chamber. The pod includes: a predetermined amount of ground coffee compacted into an aggregate of ground coffee beans, having an outer shape suitable for rolling, and preferably a substantially spherical ball shape; and a filter casing formed of at least one pervious, microporous or microperforated sheet or film, trapping and matching the shape of the compacted coffee aggregate. The sheet or film is flexible, having stretchability properties with an elongation at rupture of at least 30% and an ultimate tensile strength of less than 2,000 N/m, and a thickness of at least 150 μm.

20 Claims, 1 Drawing Sheet

(56) References Cited

U.S. PATENT DOCUMENTS

| | | | |
|---|---|---|---|
| 3,356,011 A | 12/1967 | Parraga | |
| 4,605,123 A * | 8/1986 | Goodrum | B65D 85/808 206/0.5 |
| 4,983,410 A * | 1/1991 | Dinos | B65D 85/8043 426/110 |
| 5,012,629 A | 5/1991 | Rehman et al. | |
| 5,573,841 A | 11/1996 | Adam et al. | |
| 5,725,898 A | 3/1998 | Murphy et al. | |
| 5,755,149 A | 5/1998 | Blanc et al. | |
| 6,805,041 B2 | 10/2004 | Colston et al. | |
| 6,843,165 B2 | 1/2005 | Stoner | |
| 7,270,050 B2 | 9/2007 | Glucksman et al. | |
| 7,383,763 B2 | 6/2008 | Dijs | |
| 8,178,139 B2 * | 5/2012 | Versini | B65D 85/8043 426/77 |
| 2001/0053399 A1 * | 12/2001 | Herod | B65D 85/8046 426/78 |
| 2002/0078831 A1 * | 6/2002 | Cai | A47J 31/14 99/295 |
| 2004/0115310 A1 * | 6/2004 | Yoakim | B65D 85/8046 426/77 |
| 2005/0136155 A1 * | 6/2005 | Jordan | B65D 65/466 426/77 |
| 2005/0255768 A1 * | 11/2005 | Iwasaki | B65D 85/8043 442/44 |
| 2006/0165845 A1 | 7/2006 | Kaku et al. | |
| 2006/0280841 A1 * | 12/2006 | Cai | A47J 31/14 426/77 |
| 2008/0081089 A1 * | 4/2008 | Blanc | B65D 85/8046 426/77 |
| 2008/0254169 A1 | 10/2008 | Macmahon et al. | |
| 2009/0223374 A1 | 9/2009 | Morin et al. | |
| 2010/0116142 A1 * | 5/2010 | Versini | B65D 85/8043 99/295 |
| 2010/0173054 A1 | 7/2010 | Camera | |
| 2010/0215808 A1 | 8/2010 | Versini | |
| 2010/0330236 A1 * | 12/2010 | Miyahara | B01D 39/083 426/84 |
| 2011/0283890 A1 * | 11/2011 | Scrivani | B65D 85/8043 99/295 |
| 2013/0045307 A1 * | 2/2013 | Safai | A47J 31/3676 426/77 |
| 2013/0156897 A1 * | 6/2013 | Goldstein | B65D 85/8043 426/115 |
| 2013/0186280 A1 | 7/2013 | Sekiguchi | |
| 2015/0050393 A1 * | 2/2015 | Chen | A47G 19/16 426/115 |
| 2015/0166257 A1 * | 6/2015 | Trombetta | B65D 5/4204 426/87 |
| 2015/0274413 A1 * | 10/2015 | Sanz | B65D 85/8046 206/459.5 |

FOREIGN PATENT DOCUMENTS

| | | | | |
|---|---|---|---|---|
| FR | 2875917 A1 | | 3/2006 | |
| FR | 2879175 A1 | | 6/2006 | |
| FR | 2908970 A1 | | 5/2008 | |
| FR | 2930522 A1 * | 10/2009 | | B65B 9/042 |
| FR | 2933963 A1 * | 1/2010 | | A23F 3/32 |
| WO | 0191620 A1 | | 12/2001 | |
| WO | 2008071878 A2 | | 6/2008 | |
| WO | 2012022878 A1 | | 2/2012 | |

OTHER PUBLICATIONS

International Search Report for PCT/FR2011/051761 dated Nov. 24, 2011.

"Yahoo Voices" ("How to Make Tea with an Espresso Maker"), pub. Jan. 22, 2010. http://voices.yahoo.com/how-tea-espresso-rnaker-5327703.html?cat=22.

* cited by examiner

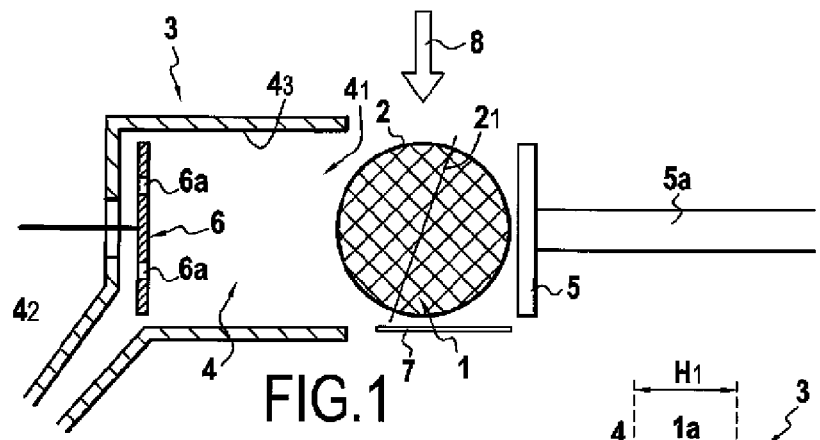
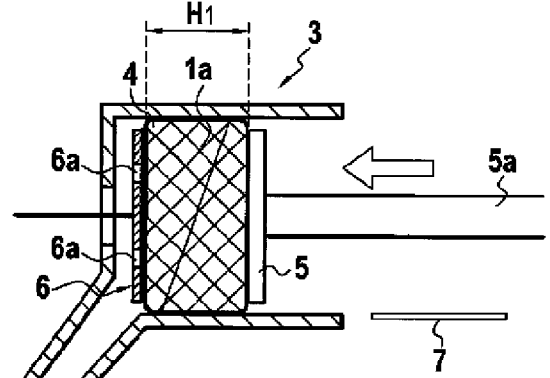
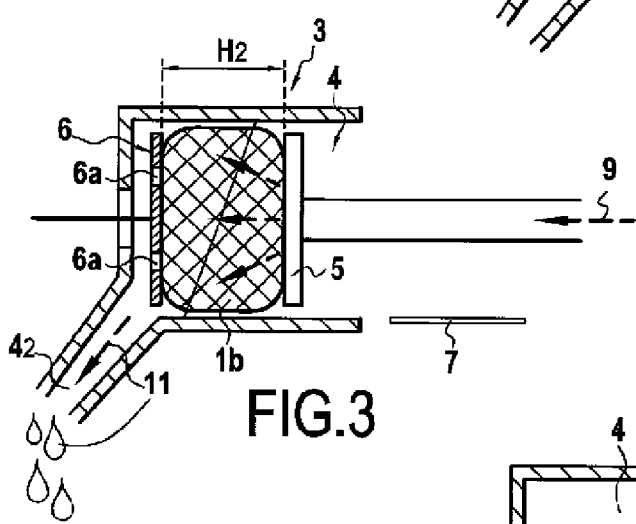
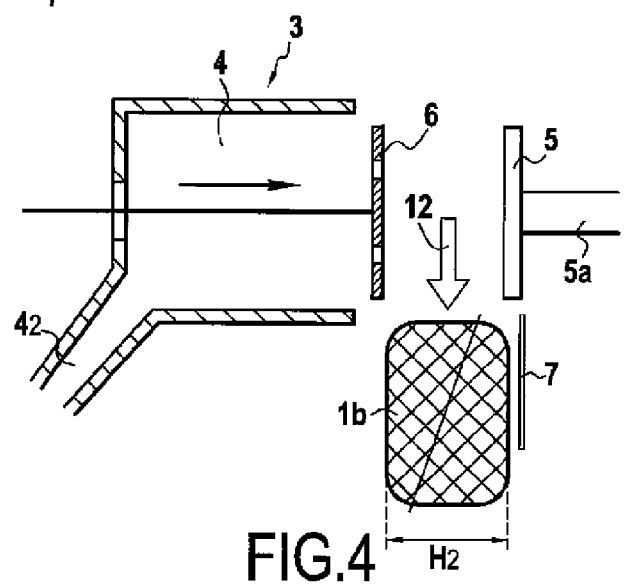

COFFEE POD HAVING A FLEXIBLE MICROPOROUS OR MICROPERFORATED CASING

CROSS-REFERENCE TO RELATED APPLICATIONS

This divisional application claims the benefit under 35 U.S.C. §121 of U.S. Pat. No. 8,940,348, issued from application Ser. No. 13/811,774 filed on Jan. 24, 2013, entitled COFFEE POD HAVING A FLEXIBLE MICROPOROUS OR MICROPERFORATED CASING, which in turn is a national phase and takes the benefit under 35 U.S.C. §371 of international application PCT/FR2011/051761 filed on Jul. 21, 2011, which turn takes its priority from French patent application FR 10 56208 filed on Jul. 28, 2010 and all of whose entire disclosures are incorporated by reference herein.

BACKGROUND OF THE INVENTION

The present invention concerns a pod for producing coffee beverages by infusing ground coffee, in particular beverages of "espresso" type, and a method for producing a beverage from said pod in a pressurized coffee machine.

Priority fields of application of the present invention are those concerning the production of ground coffees and the packaging thereof, and the preparation of coffee beverages from determined quantities of ground coffee(s) packaged in pod form.

A large number of such pods have been described in the literature.

This type of pod is used for producing coffee beverages in pressurized coffee machines, by inserting the pod in an extraction chamber in which said pod is optionally de-compacted before being infused with a hot liquid, hot water in particular, the de-compacting intended to facilitate the passing of the water and the release and solubilizing of coffee aromas to extract said aromas therefrom. De-compacting, before passing the water for extraction, allows the ensured wetting of the entirety of the coffee aggregate to avoid incomplete extraction.

Pods of compacted ground coffee are known which do not have a casing. The non-use of a casing is economically advantageous but translates as crumbling of the matter on the surface of the pod during storage or handling. In addition, when the pod is used in the coffee machine there arise problems of residual deposits of coffee grinds in said extraction chamber, this requiring an additional cleaning operation of the extraction chamber and possibly filters at the output of the liquid from the extraction chamber to prevent risks of proliferating mould, clogging of the output filters of the extraction chamber and risks of ill-functioning and/or of degradation of the coffee machine, or even poor quality of the coffee beverage prepared with the following pod inserted in a non-cleaned extraction chamber.

A description was given in FR 2 879 175 of pods of compacted ground coffee wrapped in a casing, trapping and following the contour of a compacted coffee aggregate, formed of a sheet or film of porous, filtering material and hence permeable. This casing has the advantage of preventing any crumbling of the aggregate of compacted ground coffee before it is inserted in the extraction chamber of the machine, without reducing their breaking or crushing capability under the force of the piston of the coffee machine or preventing the infusion and extraction of coffee aromas to prepare a beverage. However, in this patent, it is sought to promote the exploding of said casing into several fragments inside the extraction chamber of the coffee machine under the pressure of the piston, so as to improve the homogeneity of the infusing and extracting of the components of the ground coffee contained in the pod. For this purpose a woven or non-woven fibre fabric is used of low gram weight, between 15 and 20 g/m$^2$, and preferably having weakened zones of narrower thickness and/or having larger perforations or greater porosity. In practice, in this patent, a food-safe filter paper is used or a casing formed of a film of woven nylon fibres. These casings can therefore be torn, having insufficient elasticity to withstand firstly the deformation resulting from de-compacting and secondly the increase in volume of the pod after it has been moistened for extraction of the coffee aromas via infusion of the pod by means of a hot liquid.

However, this type of pod with filtering casing which can be torn open still has the same disadvantages as the pods without a casing with regard to the need for cleaning the extraction chamber which contains the coffee grinds mixed with fragments of the torn casing of said pod, these having to be evacuated from the extraction chamber towards a storage compartment to allow the preparing of a further beverage in the machine. Since the filter paper or micro-perforated nylon film is not elastically deformable, this material becomes torn giving rise to deposits of coffee grinds in the extraction chamber and on the filters.

A rigid or semi-rigid capsule is known from FR 2 908 970 and WO 2008/071878 that is impervious, capable of being pierced to allow the injection of pressurized water into said capsule through said perforations, and to allow the infusing of the substance, in particular the coffee trapped in said capsule, followed by the collection of an aromatized beverage flowing though said perforations. The packaging casing is initially fully watertight and airtight, and the capsule with its perforated casing containing the residual block of wet coffee grinds is collected after the liquid has flowed through said casing. This type of capsule requires the use of a coffee machine equipped with a needle piercing device and cannot be used in coffee machines not equipped with a device for piercing the casing of the capsule. It is to be pointed out that the needle piercing device is also scarcely hygienic and is likely to clog and become difficult to clean.

Additionally, in patent WO 2008/071878, when the capsule comprises a compacted aggregate of coffee, the piercing device of the casing does not perform de-compacting, the coffee aggregate remaining compact during extraction, which does not allow complete extraction or at least optimal extraction of the coffee aromas when water is injected into said casing.

It is the objective of the present invention to provide a novel type of improved pod with which it is possible to overcome the disadvantages of prior embodiments such as mentioned above.

More particularly, one objective of the invention is to provide a novel type of pod which does not require a specially designed coffee machine to produce a coffee beverage using the sad pod, and which combines the advantageous properties of protecting the coffee aggregate when it is stored and when in use, and which requires simple, easy cleaning of the machine in which the pod is used to produce a coffee beverage.

More particularly, it is one objective of the present invention to provide a "universal" pod of ground coffee i.e. which allows the preparation of coffee beverages using pressurized coffee machines of "fully-automatic" type described in FR 2 879 175.

The present invention more particularly concerns a pod of ground coffee adapted for preparing coffee and coffee beverages using "fully-automatic" machines of the type described in European patent applications EP-A-0 948 927 and EP-A-0 948 926, schematically illustrated in FIGS. 1 and 2 appended to the present application, or in document WO-A-01/91620, and comprising an extraction "group" comprising an infusion chamber into which a quantity of ground coffee is poured then tamped by at least one piston mobile in said infusion chamber, said piston being connected to the water heater of the machine and comprising means for injecting hot water through the ground coffee after it has been tamped in the chamber for extraction of the aromas therefrom.

Another objective of the invention is to provide a pod of ground coffee for machines of the aforementioned type which is able to be produced industrially at low cost.

Finally, a further objective of the invention is to provide a coffee pod which is able to be used in said machines without manual operation by a user to place said pod in position in the machine, and which on the contrary is able to be stored in a reservoir secured to or independent of said machine and inserted automatically from said reservoir into the extraction group of said machine to prepare a coffee, and which is then automatically evacuated after infusion of the coffee contained in said pod.

DESCRIPTION OF THE INVENTION

For this purpose, the present invention provides a coffee pod which can be used in machines for preparing and dispensing coffee beverages of the type comprising at least one extraction chamber and at least one piston to tamp a determined quantity of ground coffee inserted in said extraction chamber, said pod comprising:

- a determined quantity of compacted ground coffee in the form of an aggregate of ground coffee beans, whose outer shape is adapted for rolling and preferably is a substantially spherically ball shape, and
- a filtering casing formed of at least one permeable microporous or micro-perforated sheet or film trapping and following the contour of said aggregate of compacted coffee, characterized in that said sheet or film is flexible having stretch properties with an ultimate elongation (elongation at break) of at least 30%, an ultimate tensile strength (tensile strength at break or yield strength) of less than 2,000 N/m, and a thickness of at least 150 µm, preferably from 150 to 500 µm.

The pod of the invention is advantageous in that its casing meets the function of protection during storage and handling of the pod before use, the function of de-compacting and filtering the ground coffee beans under the effect of the pressure of the piston of the coffee machine, allowing the infusion and extraction of coffee aromas for preparing a beverage, whilst retaining within it the ground coffee particles after infusion via the micro-perforated or microporous structure of the casing.

Finally, through its solidity and stretch properties, said casing has the advantage of allowing the de-compacting of the coffee aggregate it contains, by changing shape and increasing in volume without tearing.

With said casing it is effectively possible to de-compact said pod by changing the shape of the pod via compression and allowing the swelling of the moistened pod after injection of pressurized water through the casing, without the casing becoming torn and hence without spilling grinds onto the input filters for the hot water and output filters for the coffee leaving the extraction chamber of the extraction apparatus.

On account of its elasticity, said casing remains moulded against the pod of initially compacted ground coffee and therefore allows better maintaining of the initial shape, in particular the initial spherical shape, of said pod when it is stored or being handled.

Said pod also provides for facilitated ejection of the compacted mass that was de-compacted and swollen after infusion, to outside the extraction chamber. The extraction chamber therefore always remains clean without any residue of coffee grinds, which avoids the proliferation of bacteria and clogging of the filters possibly leading to ill-functioning of the extraction system.

Finally the absence of any residue in the extraction apparatus, left behind after prior use thereof, additionally allows the guaranteed more homogenous and more regular quality of extraction of coffee aromas and of taste, and finally provides for an increased mechanical lifetime of the extraction device.

The thickness of the casing and its elongation properties of at least 30% mean that it is possible, without any risk of rupturing the casing even if it is formed of two heat-welded sheet or film parts to form a volume, that there is no tearing either at the weld or elsewhere when the coffee aggregate is de-compacted and the casing is deformed under the pressure of a piston in the extraction chamber of a coffee machine; and more especially it allows the casing to continue following the contour of the surface of the pod mass of coffee grounds after injection of a pressurized hot liquid into the de-compacted ground coffee, the volume of the casing increasing up to 30% depending on the conditions of use of said coffee machine.

The micropores or microperforations are of suitable size and density to allow the flowing of the aromatized liquid and the retaining of residual coffee grinds within said casing.

More particularly, the micropores or microperforations of said sheet or said film of the casing are smaller than the size of the particles of ground coffee forming said aggregate, and have a mean size of less than 0.3 mm, preferably from 100 to 300 µm to retain the particles of coffee grounds these generally having a mean size of 300 to 500 µm.

The elongation at break and yield strength parameters are measured by stretching the sheet or film with a dynamometer and by measuring the elongation before rupture (ultimate elongation) as per standard NF EN 1940 (classification X41-025) and the tensile strength required for rupture (ultimate tensile strength) thereof as per standard NF EN 1941 (classification X41-021) or the Inst/MC 203 method.

Said casing does not therefore comprise any weakened zone in the form of a reduced thickness or additional perforations, in particular in the form of localized reduced thickness or additional perforations. Said casing is able to withstand a compressive force at least equal to the pressure applied by a tamping piston inside the extraction chamber of a coffee machine, namely a pressure of 500 to 1,500 kPa, more particularly from 700 to 1,200 kPa.

In one preferred embodiment, said casing has a gram weight of between 20 and 50 $g/m^2$.

Said casing can be made of a natural or synthetic biodegradable material, cast or woven or non-woven, in this latter case comprising woven or entangled fibres.

In one first variant of embodiment said casing is formed of a nonwoven material of entangled synthetic fibres, the largest size of said surface micropores being 0.15 to 0.30 mm, preferably having air permeability of 3,000 to 6,000 $l/m^2/s$ under testing using the EDANA 140.2-99/WSP 70.1 method (the method used by the European Association of manufacturers of nonwovens—EDANA) or using the Inst/MC 227 method (the test used by other manufacturers of nonwovens).

The air permeability test entails measuring the flow rate of air passing through a given surface of a sheet of nonwoven material for a defined head loss between the air input and output, in particular a head loss of 100 Pa for a surface of 20 cm$^2$.

More particularly, the nonwoven material also has a water permeability of 500 to 1,500 l/m$^2$/s under testing as per standard Inst/MC 336 which entails positioning a column of water above a surface 20 mm in diameter of said nonwoven material, and measuring the time required for a given quantity of liquid to flow through said surface.

In another variant of embodiment, said casing is formed of a film of micro-perforated synthetic plastic material, the largest size of said micro-perforations being 0.15 to 0.30 mm and said film having a surface density of perforations of 50 to 250 perforations/cm$^2$.

It will be understood that the constituent material of the sheet or said film is a water-insoluble material and is of food-safe quality i.e. acceptable for packaging food compositions and products.

More particularly, the constituent material(s) of said casing are chosen from among polyethylene, preferably of HDPE type, polypropylene and polyester.

More particularly, said casing is formed of a nonwoven material of polyester fibres coated with polyethylene.

This bi-component fibre is advantageous since polyethylene has a melt temperature of 150° C., lower than that of polyester which is 182° C., during heat treatment for heat welding of said casing such as described below, only the polyethylene melts thereby ensuring the function of binder between the entangled fibres and between two casing parts or two semi-casings.

Most particularly, said casing is formed of a film of polyethylene or polypropylene.

According to another particular characteristic, said casing comprises two semi-casings, preferably symmetrical, more preferably semi-spherical, sealed to each other preferably via heat welding, along at least one continuous, junction line peripheral to the pod, the constituent material of said casing having a melt temperature higher than 100° C.

It will be understood that a melt temperature higher than 100° C. means that the material will not be degraded when the pressurized hot liquid is injected to prepare a beverage, into said pod in a coffee machine.

More particularly, said quantity of compacted coffee is 5 to 15 g, preferably 5 to 8 g, and the density of the compacted ground coffee forming said compacted aggregate is 0.65 to 0.75 kg/dm$^3$, preferably 0.68 to 0.72 kg/dm$^3$.

A said quantity of coffee corresponds to the mean quantity of coffee needed to prepare a coffee of "espresso" type using a fully automatic, semi-automatic or manual coffee machine.

The density values also correspond to the limit values of density and diameter at which satisfactory results i.e. at least as good as with non-compacted ground coffee, were obtained for preparing beverages using fully automatic, semi-automatic or manual machines, in terms of taste of the prepared beverages and functioning of the machine.

Preferably, the pod has an outer shape adapted for rolling, and preferably a shape comprising at least one rounded position, further preferably a substantially spherical ball shape which facilitates de-compacting thereof.

More particularly, said pod is of substantially spherical, cylindrical or ovoid shape, preferably spherical and its maximum size is 20 to 40 mm, preferably having a diameter of 24 to 34 mm for a spherical pod, further preferably a diameter of 26 to 30 mm for a spherical pod.

The present invention also provides a method for preparing a coffee beverage using a pod according to the invention, in a coffee machine comprising an extraction chamber capable of receiving a said pod, and at least one compression piston and one ejection piston for said pod inside said extraction chamber, characterized in that the following successive steps are performed in which:

1/ said pod is inserted in said extraction chamber of a coffee machine; and

2/ said pod is compressed preferably at a pressure of 500 to 1,500 kPa, inside said extraction chamber by means of said compression piston until said pod is crushed and deformed and said aggregate of compacted ground contained in said casing coffee is de-compacted, without rupturing said casing, and 3/ a determined quantity of water is injected as pressurized hot liquid at a pressure of 2 to 20 bars (200 KPa to 2 MPa), preferably water at a temperature of 85 to 100° C., preferably 86 to 96° C. through said de-compacted pod, and 4/ a beverage is collected in a suitable recipient containing the aromas of coffee solubilised in said hot liquid, extracted under pressure through said pod at step 2/, and 5/ said wet pod, the block of residual wet coffee grinds of different shape to said initial pod and of greater volume than said initial pod, is evacuated by means of said ejection piston to outside said extraction chamber.

More particularly, an extraction chamber of cylindrical shape is used, of circular cross-section and of slightly larger diameter than the diameter of a spherical pod and at step 2/ deformation of substantially cylindrical shape of said pod is obtained. And at step 3/ the increase in volume of said pod, deformed further to injection of hot liquid, without rupture of said casing, is made possible by the elongation and strength properties of said casing.

At step 2/, the de-compacting pressure is in general 700 to 1,200 kPa, corresponding to a force of 50 to 100 kg applied to a circular surface, corresponding to the cross-section of an extraction chamber of diameter 30 to 40 mm. It is to be noted that the pressure applied to the pod must be sufficient to achieve de-compacting but must not be excessive so as not to re-compact the pod to a greater density which would harm the good extraction of the coffee during passing of the water.

At step 3/ a hot liquid is used at a temperature of 86 to 96° C. to obtain optimal extraction of the coffee aromas i.e. under conditions of maximum extraction yield without degrading said aromas. The quantity of liquid injected may vary in relation to the concentration of coffee aromas of the beverage it is sought to obtain.

The de-compacting action at step 2/ is important since a pod that is not de-compacted cannot fully release its aromas by extraction via injection of water under pressure according to step 3/.

In addition to the foregoing description, a further subject of the invention is a method for preparing a coffee pod according to the invention in which, at a first step, a determined quantity of non-compacted ground coffee is prepared, then at a second step said quantity of ground coffee is compacted to form a solid aggregate of coffee preferably of rounded shape adapted so that it can be rolled.

Next, at a third step, said solid coffee aggregate is wrapped and trapped in a casing following the shaped contour of said aggregate, said casing preferably being formed of two semi-casings of a flexible material sealed onto each other.

Advantageously, at the second step, the ground coffee is compacted between two dies of a mould, preferably symmetrical, until the desired density of coffee is obtained, preferably between 0.65 and 0.75 kg/dm$^3$, further preferably between 0.68 and 0.72 kg/dm$^3$.

When said casing surrounding the coffee aggregate is formed of two semi-casings, these are preferably sealed onto each other by heat welding along a said junction line.

To improve the productivity of the method, it is possible to perform said second and third steps thereof simultaneously.

BRIEF DESCRIPTION OF THE DRAWINGS

Other characteristics and advantages of the present invention will become apparent in the light of the description given with reference to FIGS. 1 to 4 which schematically illustrate the different steps of a method for producing coffee beverages using a pod of the invention, in which:

FIG. 1 illustrates the step to insert the pod in an extraction chamber of a pressurized coffee machine, FIG. 2 illustrates the de-compacting step by compressing the pod with a piston, inside the extraction chamber, FIG. 3 illustrates the injection step of hot water into the tamped pod and percolation, and FIG. 4 illustrates the step to eject the block of coffee grinds after percolation.

EXAMPLE 1

An aggregate of ground coffee of spherical shape was prepared, of diameter about 28 mm and weight 7 g, with a density of about 0.7 kg/dm$^3$, using a method known to person skilled in the art and described in particular in FR 2 875 917.

A casing was prepared intended to cover said spherical pod of compacted coffee, from a bi-component film of nonwoven fibres marketed by PGI (Polymer Group Inc.)/NORDLYS (France—59270 Bailleul) under the reference PACKLINE 3500 comprising a PET polyester core coated with polyethylene, this film having a gram weight of 35 g/m$^2$ and a thickness of 370 μm, of mean pore size 65 μm over a pore size range of 20 μm to 316 μm, having an air permeability (also known as "air porosity") of 4,500 l/m$^2$/s under testing using the reference method Inst/MC 227 (test also used by the manufacturer and other manufacturers of nonwovens).

This film exhibited mechanical ultimate elongation properties of 45% (direction of the machine) and 80% (perpendicular to the direction of the machine) and a yield strength of 90 N/5 cm i.e. 1,800 N/m (direction of the machine) and 40 N/5 cm i.e. 800 N/m (perpendicular to the direction of the machine) calculated as per standards NF EN 1940 and 1941 mentioned above.

The casing was formed by heat sealing two smear-spherical semi-casings by covering a ball of compacted coffee with two semi-casings and heat sealing at their circular equatorial junction zone $2_1$ as described in patent FR 2 875 917.

EXAMPLE 2

A coffee beverage was prepared using a coffee machine 3 such as described in FR 2 879 175 of the type described in EP 948926 and schematically illustrated in FIGS. 1 to 4. This machine 3 essentially comprises an extraction group comprising an extraction and infusion chamber 4 formed of a cylinder open at one end $4_1$ and from the bottom of which there extends a tube $4_2$. Inside said chamber a filtering device is positioned comprising a supporting tray 6 on which there rests a perforated grid (not illustrated) allowing the passing of liquid but retaining any particles of ground coffee. The supporting tray 6 on its periphery comprises a sealing gasket (not illustrated) in contact with said walls $4_3$ of the chamber and the tray 6, and at least one opening $6a$ allowing the flowing of liquid coffee from inside the chamber 4 towards the tube $4_2$.

This tube $4_2$ allows the evacuation of the infused liquid coffee from inside the chamber 4 towards the outside thereof and its dispensing into a suitable recipient (not illustrated) arranged outside the machine under the end of the tube $4_2$.

The opening $4_1$ of the chamber 4 is positioned in communication with a reservoir of coffee pods (not illustrated). When operated by a user, a pod 1 is ejected 8 from the reservoir towards the inside of the chamber 4. A piston 5 connected to a water heater of the machine via a pipe $5a$ and comprising orifices through its bearing surface for diffusing water from the pipe $5a$ allows compression to be applied onto the pod 1 to obtain de-compacting thereof as illustrated in FIG. 2. This piston 5 has a diameter substantially equal to the inner diameter of the chamber 4 and on its periphery comprises a gasket (not illustrated) adapted to obtain a seal between the cylindrical wall of the chamber 4 and the piston 5 when preparing a coffee and thereby avoid spraying outside the chamber 4 when hot water is injected under pressure at a temperature of about 90° C. into the coffee, once the piston 5 has been actuated in translation inside the chamber 4 to tamp the pod 1 and de-compact the ground coffee contained therein with a compression force between 50 and 100 kg. At this point, the de-compacted/tamped pod is still dry and is then of substantially cylindrical shape with a diameter substantially corresponding to the inner diameter of the chamber 4 i.e. about 30 mm and of height $H_1$=17.5 mm.

Next as illustrated in FIG. 3, water is injected under pressure 9 through the pipe $5a$ to achieve percolation of the coffee when the water passes through the micro-perforated or microporous pod. The water is injected at a pressure that is conventionally between 8 and 12 bars into the orifices of the piston 5, then through the deformed pod $1a$ of cylindrical shape. Under the effect of the pressure of the water diffused through the piston 5, the infused liquid coffee flows 11 through the orifices of the filter and the orifices $6a$ of the tray 6 and through the tube $4_2$ towards the recipient outside the machine (not illustrated).

At this point, the block of wet ground coffee grounds, de-compacted and encased, has increased in volume on account of this resumed humidity to reach a shape still substantially cylindrical having a diameter of 30 mm and height of about $H_2$=20 mm, i.e. compared with the initial spherical shape an increase in volume of about 21.5% (13.98–11.5=2.48 cm$^3$) and an increase in the surface of its circular cross-section of about 27% (3.13–2.46=0.67 cm$^2$).

Having regard to the elastic deformation properties of the film having an ultimate elongation of more than 30%, the casing 2 of the pod is not torn or degraded by the compacting/percolation process. Elastic deformation of 30% is sufficient to change from the initial spherical shape to the final cylindrical shape of larger volume, without rupture of the casing.

FIG. 4 illustrates the final ejection phase of the block of coffee grinds in the casing of spherical shape $1b$, the injection means here being provided by actuation in translation of said tray 6 and pivoting of a side wall element 7 so as to remove 12 the used pod towards a storage reservoir (not illustrated).

EXAMPLE 3

Spherical balls of aggregates of compacted ground coffee were prepared such as defined in Example 1, which were wrapped in a casing made from a perforated film of polyethylene or polypropylene having a thickness of 200 to 300 μm, with micro-perforations of 0.15 to 0.25 mm and a perforation density of about 100/cm$^2$.

These casings used in a method for preparing coffee such as defined in Example 2 exhibited mechanical ultimate elongation properties and yield strength properties conforming to the present invention.

The invention claimed is:

1. A coffee pod which can be used in machines for preparing and dispensing coffee beverages of the type comprising at least one extraction chamber and at least one tamping piston to tamp a determined quantity of ground coffee inserted in said extraction chamber, said pod comprising:

about 5 to 15 g of compacted aggregate of ground coffee, said compacted aggregate having a density that is about 0.65 to 0.75 kg/dm$^3$ and having a spherical shape of about 20 to 40 mm in diameter, and an external filtering casing formed of at least one permeable, microporous or micro-perforated sheet or film trapping and following the contour of and molded against said compacted aggregate of coffee, wherein said sheet or said film is flexible having stretch properties with an ultimate elongation of at least 30%, an ultimate tensile strength of less than 2,000 N/m and a thickness of about 150 to 500 µm wherein said casing presents solidity and stretch properties allowing de-compacting of the coffee aggregate contained in the casing, by changing shape and increasing volume and allowing the swelling of the moistened pod after injection of pressurized water through the casing, without the casing becoming torn via compression.

2. The pod according to claim 1, wherein said casing has a gram weight of between 20 and 50 g/m$^2$.

3. The pod according to claim 1, wherein said casing is formed of a nonwoven material of entangled synthetic fibres, with surface micropores, wherein the largest size of said surface micropores is 0.15 to 0.30 mm.

4. The pod according to claim 1, wherein said casing is formed of a film of microperforated synthetic plastic material, the largest size of said microperforations being 0.15 to 0.30 mm, and said film having a surface density of perforations of 50 to 250 perforations/cm$^2$.

5. The pod according to claim 3, wherein the constituent material(s) of said casing are chosen from among polyethylene, polypropylene, polyester and viscose.

6. The pod according to claim 3, wherein said casing is formed of a nonwoven material of polyester fibres coated with polyethylene.

7. The pod according to claim 5, wherein said casing is formed of a film of polyethylene or polypropylene.

8. The pod according to claim 1, wherein said casing comprises two semi-casings sealed onto each other along at least one continuous junction line peripheral to the pod, the constituent material of said casing having a melt temperature higher than 100° C.

9. The pod according to claim 8, wherein said semi-casings are symmetrical and semi spherical and sealed onto each other by heat welding.

10. The pod according to claim 9, wherein said quantity of compacted coffee is 5 to 8 g, and the density of the compacted ground coffee forming said compacted aggregate is 0.68 to 0.72 kg/dm$^3$.

11. The pod according to claim 10, wherein said pod is substantially spherical with a diameter of about 24 to 34 mm.

12. The pod according to claim 11 with a diameter of about 26 to 30 mm.

13. The pod according to claim 2, wherein said casing is formed of a nonwoven material of entangled synthetic fibres, with surface micropores wherein the largest size of said surface micropores is 0.15 to 0.30 mm.

14. The pod according to claim 2, wherein said casing is formed of a film of microperforated synthetic plastic material, the largest size of said microperforations being 0.15 to 0.30 mm, and said film having a surface density of perforations of 50 to 250 perforations/cm2.

15. The pod according to claim 14, wherein the constituent material(s) of said casing are chosen from among polyethylene, polypropylene, polyester and viscose.

16. The pod according to claim 15, wherein said casing is formed of a nonwoven material of polyester fibres coated with polyethylene.

17. The pod according to claim 15, wherein said casing is formed of a film of polyethylene or polypropylene.

18. The pod according to claim 2, wherein said casing comprises two semi-casings sealed onto each other along at least one continuous junction line peripheral to the pod, the constituent material of said casing having a melt temperature higher than 100° C.

19. The pod according to claim 18, wherein said semi-casings are symmetrical and semi spherical and sealed onto each other by heat welding.

20. The pod according to claim 19, wherein said quantity of compacted coffee is 5 to 8 g, and the density of the compacted ground coffee forming said compacted aggregate is 0.68 to 0.72 kg/dm3.

* * * * *